Patented Oct. 22, 1940

2,219,205

UNITED STATES PATENT OFFICE 2,219,205

PRODUCTION OF PHOSPHORESCENT SUBSTANCES

Leo Boente, Ludwigshafen-on-the-Rhine, Germany, assignor to I. G. Farbenindustrie Aktiengesellschaft, Frankfort-on-the-Main, Germany No Drawing. Application July 6, 1939, Serial No. 283,045. In Germany July 18, 1938

3 Claims. (Cl. 250—81)

The present invention relates to the production of phosphorescent substances.

I have found that phosphorescent substances are obtained by incorporating coronene (hexabenzobenzene) with solid polynuclear, completely hydrogenated hydrocarbons. The incorporation may be effected for example by allowing a fused mixture to solidify or by allowing a solution of the mixture to crystallize. The coronene ($C_{24}H_{12}$, melting point 432° C. (corrected), boiling point 525° C.) may be obtained synthetically and also from destructive hydrogenation products of coals, tars and cracking residues, for example by distillation.

As solid, polynuclear, fully hydrogenated hydrocarbons there may be mentioned fully hydrogenated anthracene, pyrene or coronene. The addition of coronene thereto may be effected for example in amounts of from 0.5 to 5 per cent. Still smaller amounts, as for example down to 0.1 per cent, or larger amounts, as for example up to 10 or 20 per cent, may also be added to the melts or solutions of hydrogenated polynuclear hydrocarbons. When using fully hydrogenated coronene, the phosphorescent substance may advantageously be prepared by hydrogenating coronene in such a manner that the hydrogenation product still contains coronene in addition to fully hydrogenated coronene. The preparation of the hydrogenated hydrocarbons is preferably effected under a high hydrogen pressure, as for example at from 50 to 500 atmospheres or more, and at temperatures between about 200° and 400° C. in the presence of catalysts. As catalysts there may be mentioned for example the known hydrogenation catalysts, in particular those which are not sensitive to sulphur, such as sulphides or the heavy metals, in particular of the 6th group of the periodic system.

The phosphorescent substances obtained in this manner, especially when they have a coronene content of from about 1 to 3 per cent, have an extremely strong phosphorescence which is yellow-green at ordinary temperature and which persists for a long period after short exposure to natural or artificial light. The shade of color of the phosphorescence changes with the temperature and is blue-violet for example at temperatures above about 80° C.

The phosphorescent substances may be used with advantage as additions to synthetic substances and dyestuffs.

The following examples will further illustrate how the said invention may be carried out in practice but the invention is not restricted to these examples.

Example 1

Coronene is mixed with 5 times its amount of decahydronaphthalene and introduced into a pressure vessel provided with tungsten sulphide as catalyst. Hydrogen is pressed in up to a pressure of 200 atmospheres. The whole is then heated to 270° C., the pressure thus rising to about 350 atmospheres. These reaction conditions are maintained for 12 hours, hydrogen being freshly pressed in as the pressure falls. The hydrogenation product obtained, which still contains about 1 per cent of coronene, is freed from decahydronaphthalene by distillation and crystallized from xylene. A substance is obtained which consists of white needles having a melting point of 370° C. (corrected) and a boiling point of 435° C. After exposure to light for a short time the substance has a strong yellow-green phosphorescence.

Example 2

Pyrene is introduced without the use of a solvent into a pressure vessel provided with tungsten sulphide as catalyst. Hydrogen is pressed in up to a pressure of 200 atmospheres. The whole is then heated to 270° C., the pressure thus rising to about 350 atmospheres. The reaction conditions are maintained for 10 hours, hydrogen being pressed in when the pressure falls. The hydrogenation product obtained consists to the extent of more than 80 per cent of fully hydrogenated pyrene. By washing or crystallizing while using a mixture of benzene and alcohol, or by fractional distillation, there is obtained a pure fully hydrogenated pyrene consisting of glass-clear prismatic crystals and having a melting point of 104° C. The hydrogenated pyrene is dissolved together with 1 to 2 per cent of coronene in a mixture of benzene and alcohol. By crystallization of this solution there is obtained a product which after short exposure to light has a strong yellow-green phosphorescence which persists for a long period.

What I claim is:

1. A phosphorescent substance essentially comprising coronene and a solid polynuclear, fully hydrogenated hydrocarbon.

2. A phosphorescent substance essentially comprising an amount of from about 0.1 to 20 per cent of coronene and a polynuclear, fully hydrogenated hydrocarbon.

3. A phosphorescent substance essentially comprising coronene and fully hydrogenated coronene.

LEO BOENTE.